United States Patent Office 3,443,872
Patented May 13, 1969

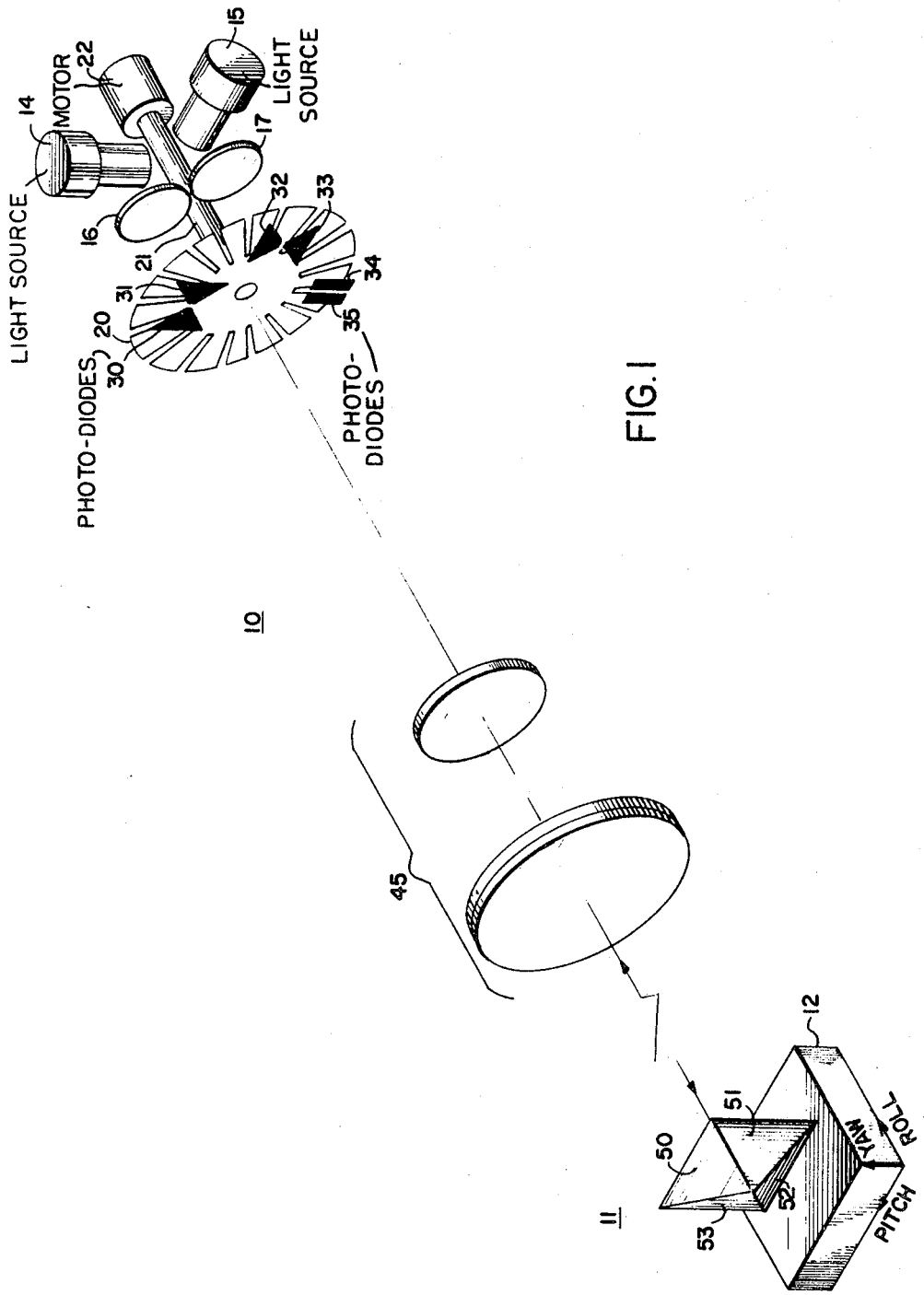

3,443,872
REMOTE OBJECT ORIENTATION
MEASURING DEVICE
Donald W. Colvin, Clearwater, John C. Comeau, St. Petersburg, and Frederick Kulick, Clearwater, Fla., assignors to Honeywell Inc., Minneapolis, Minn., a corporation of Delaware
Filed Aug. 31, 1964, Ser. No. 393,165
Int. Cl. G01c 1/00
U.S. Cl. 356—147                                                2 Claims

ABSTRACT OF THE DISCLOSURE

Apparatus to sense the orientation of a remote member about three axes by directing two mutually orthogonal flat beams of light to an internally reflecting right angle pyramid and measuring the various reflected images with three pairs of detectors.

---

This invention pertains to apparatus for determining the orientation of a member, such as an inertial platform, with reference to some predetermined orientation such as three earth axes and more particularly the present invention pertains to electro-optical apparatus capable of providing signals indicative of the misorientation of a member about three predetermined, mutually orthogonal axes.

Optical links, sometimes known as optical synchros, optically determine the orientation of the member it is desired to align with respect to a reference member or set of axes. The optical link usually produces electrical signals indicative of the misorientation of the member to be aligned and these electrical signals are utilized to reposition the member. A more specific example in which an optical link is utilized is the initial alignment of an inertial platform in a missile. Generally the inertial platform is mounted on the interior of the missile and must be aligned with some exterior reference. A window is provided in the surface of the missile, so that the inertial platform may be observed from the exterior. An optical link is then set up to determine the orientation of the inertial platform and to provide electrical signals which will reposition the platform to the desired orientation in the event of a misalignment.

In prior art devices either three separate single-axis autocollimators were used to observe the surfaces of a cube fixedly attached to the inertial platform or in the case of a 3-axis optical link the pitch and yaw axes orientation could be determined by simply reflecting light beams from a flat mirror and the roll axis orientation was determined by utilizing polarized light. The use of two or more autocollimators to determine the orientation of a member is undesirable because of the setup time and the plurality of readings that must be taken. The use of polarized light to determine the orientation of the roll axis is undesirable because polarized light will not pass through many transparent obstacles without losing some or all of its information.

In the present invention a transducer, which may be for example a four-sided pyramid having approximately 90° dihedral angles between opposite sides, is mounted on the member to be aligned so that the base of the pyramid is facing the light source, which will be explained. In the apparatus mounted external or at some distance from the member to be aligned a pair of lamps, which may contain ribbon filaments, constitute the light producing means. The lamps are mounted so their ribbon filaments are approximately orthogonal and in the same plane. A pair of condenser lenses then directs the light through a chopping disk which modulates the light at some substantially constant frequency.

Light sensitive silicon detectors in the form of flat surfaces are utilized to convert light to electrical signals. In the present embodiment six such detectors are utilized but it should be understood that this number is not critical and more detectors could be utilized but they would simply be redundant. The six detectors are utilized in three pairs each pair having a slit or blank spot therebetween which will not produce an electrical signal when light falls thereon. In addition the pairs are connected together electrically so that any light falling with equal intensity on both detectors in the pair has an equal but opposite effect and produces substantially no electrical signal. The three pairs of detectors are mounted in a plane parallel with the chopping disk so that their active surfaces face away from the chopping disk. In addition, the detectors are located so that light from the two lamps will pass freely through the chopping disk and pass the detectors in the form of two slits of light perpendicular to each other.

The two slits of light pass through a system of lenses which collimate the light and this collimated light is then directed at the transducer, or base of the pyramid. The pyramid acts like a pair of orthogonal Porro prisms and reflects two images back for each of the slits of light impinging thereon. Three of the four images reflected back into the system are focused between the active surfaces of the pairs of detectors when the transducer is correctly oriented. Thus, no light strikes the detectors and no electrical signal is produced. If the pyramid is misaligned about any of the three axes light strikes at least one of the detectors and an electrical signal is produced which is indicative of the amount of misalignment.

Thus, in the present invention disclosure an electro-optical alignment system is described which is capable of providing electrical signals indicative of the orientation of a member about three axes utilizing ordinary light and an externally mounted transducer.

It is a primary object of this invention to provide an improved control apparatus.

It is a further object of this invention to provide apparatus for determining the orientation of a member about three axes.

It is a further object of this invention to provide electro-optical apparatus for determining the orientation of a member about three axes in which ordinary light is utilized.

These and other objects of this invention will become apparent from the following description of a preferred form thereof and the accompanying specification, claims, and drawings, of which:

FIGURE 1 is a schematic diagram of the optical system;

Figure 4:
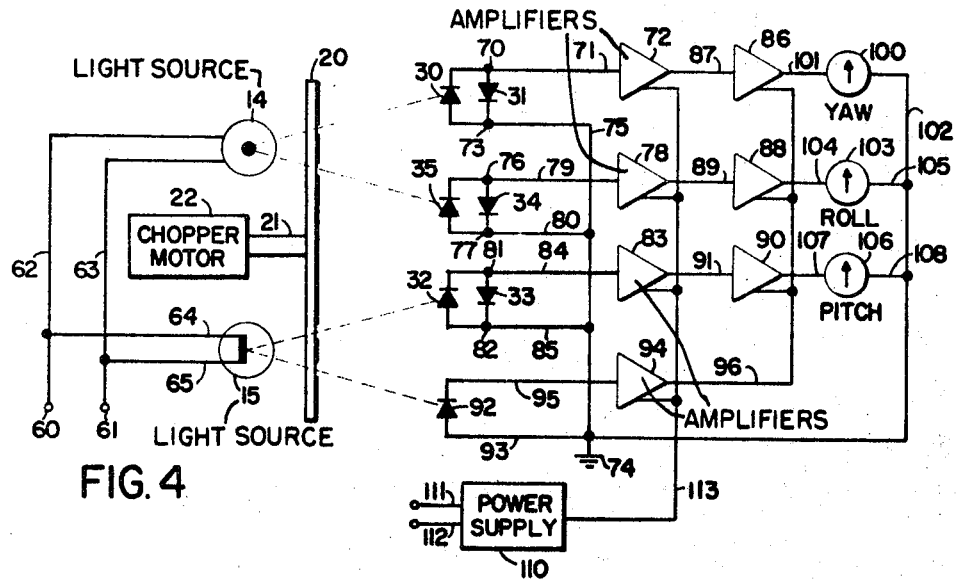
FIGURE 4 is a block diagram of the electronic system.

In FIGURE 1 a somewhat schematic diagram is shown which illustrates the physical relationship of the various components in the present apparatus. The means of mounting the various components are not shown so that a clear view of the component relationship can be seen. However, it should be understood that the various components may be mounted in any of the methods generally utilized and well known in the art. The numeral 10 generally designates the electro-optical system which is mounted external to the member it is desired to align. The numeral 11 generally designates the transducer which is fixedly mounted to the member which is designated numeral 12 in FIGURE 1. The member 12 is illustrated simply as a box since it could be any of a variety of devices and is not pertinent to the present invention.

Contained within the electro-optical system 10 are a pair of ribbon filament lamps 14 and 15. Lamps 14 and 15 are mounted so that their ribbon filaments are in the same plane and perpendicular to each other. Lamp 14 is mounted so that its filament is generally vertical and lamp 15 is mounted so that its filament is generally horizontal. A pair of lenses 16 and 17 direct the light from lamps 14 and 15 respectively through a chopping disk 20. Chopping disk 20 is simply an opaque disk having a plurality of radial slits around its outer diameter to allow light to pass therethrough at some predetermined frequency. The light from lamps 14 and 15 directed through disk 20 appears as two lines of light or an image of the ribbon filaments. It should be noted that the size and shape of the slits is not critical to the invention. The chopping disk 20 is fixedly attached to a rotatably mounted shaft 21 which is in turn attached to a motor 22. The speed of motor 22 and the number of radial slits cut in disk 20 determine the frequency with which the light from lamps 14 and 15 will be modulated.

The numerals 30 through 35 designate six photodetectors which in the present embodiment may be light sensitive silicon chips. The photodetectors 30 through 35 have a flat front surface which is activated when light impinges thereon and produces an electrical signal proportional to the impinging light. All six of the photodetectors 30 through 35 are arranged with their active surfaces in a plane parallel to the chopping disk 20 and facing away from the disk 20. The arrangement of the photodetectors 30 through 35 can be seen more clearly in FIGURE 2.

Figure 2:
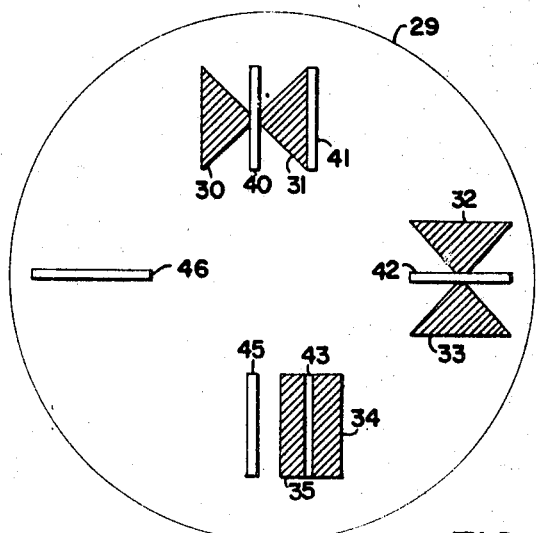
FIGURE 2 illustrates the orientation of the six light detectors.

As can be seen in FIGURE 2 the photodetectors 30 through 35 are mounted on an opaque disk 29. Disk 29 is not shown in FIGURE 1 so that the physical relationship of chopping disk 20 and photodetectors 30 through 35 can be seen more clearly. Photodetectors 30 and 31 are triangularly shaped in the present embodiment to provide a linear electrical output indicative of the amount of misalignment of the member 12 about the yaw axis. However, it should be noted that the shape of the various detectors is not critical to the invention and many other forms may be utilized. The triangularly shaped photodetectors 30 and 31 are approximately the same size and are mounted on disk 29 so that their sides are parallel and the apexes of the triangles would meet at a point. However, the apexes of the triangularly shaped photodetectors 30 and 31 are slightly truncated to provide a passive area 40 between two photodetectors. An active or transparent slit 41 in disk 29 is located beside photodetector 31 or along the base of the triangularly shaped photodetector 31. Light from lamp 14 passing through the slits in the chopping disk 20 emeges through the active slit 41 in the opaque disk 29.

Photodetectors 32 and 33 are triangularly shaped and situated with respect to each other in the same manner as photodetectors 30 and 31. A slit 42 between 32 and 33 is an active or transparent slit in disk 29 and light from lamp 15 which passes through chopping disk 20 emerges through active slit 42. Active slit 42 is located at the right hand side of disk 29 and is approximately 90° from the active slit 41 in opaque disk 29. Thus, active slit 41 is at the top of opaque disk 29 and generally vertical while active slit 42 is generally horizontal. Photodetectors 32 and 33 are triangularly shaped so that the electrical output is a linear indication of the magnitude of misalignment of member 12 about the pitch axis.

Photodetectors 34 and 35 are rectangularly shaped and situated in juxtaposition so that a passive area 43 is therebetween. Passive area 43 is approximately 90° from the active slit 42 on disk 29 and is also 180° from the active slit 41. Photodetectors 34 and 35 are rectangularly shaped so that the electrical output therefrom will be a linear indication of the misalignment of member 12 about the roll axis. The outputs of the various detectors 30 through 35 will be explained in more detail later.

The light from lamp 14 passing through the chopping disk 20 and emerging from the active slit 41 beside photodetector 31 is collimated by a lens system 45 and passes out of the electro-optical apparatus to the transducer 11 mounted on the member 12. In the disclosed embodiment the transducer 11 is a four sided pyramid having approximately a 90° dihedral angle between the opposite sides. In FIGURE 1 the four sides of the pyramid comprising transducer 11 are designated 50 through 53.

Figure 3:
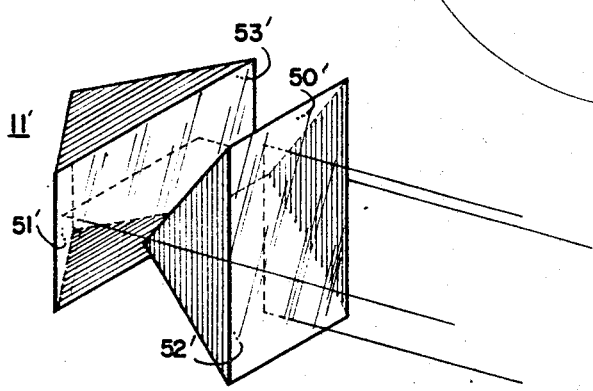
FIGURE 3 illustrates a pair of orthogonal Porro prisms utilized as a transducer.

The pyramid 11 in FIGURE 1 operates in the present apparatus as if it were a pair of Porro prisms mounted in an orthogonal relationship with their hypotenuse faces parallel, as shown in FIGURE 3. The pair of orthogonal Porro prisms in FIGURE 3 are designated 11' and the sides equivalent to the sides of the pyramid 11 have similar numbers with a prime added. The transducer 11' in FIGURE 3 could actually be substituted for the transducer 11 in FIGURE 1 and the operation would be similar.

The light from lamp 14 emerging from slit 41 in the opaque disk 29, which is collimated by the lens system 45, enters the base of pyramid 11. Some of the light entering the base strikes sides 50 and 52 and after being reflected twice internally emerges again from the base of pyramid 11 and returns to substantially the same point on the opaque disk 29 from whence it came. This light reflecting from the sides 50 and 52 of pyramid 11 is insensitive to movement of the pyramid 11 about the pitch axis. However, any movement of the pyramid 11 about the yaw axis will cause the return point of the light to be displaced horizontally.

Thus, in the present embodiment if the base of the pyramid 11 were aligned exactly parallel with the opaque disk 29 the light emerging from slit 41 would return to slit 41. However, the pyramid 11 is intentionally slightly misaligned about the yaw axis so that the light emerging from slit 41 returns to the passive area 40. This slight, intentional misalignment of pyramid 11 is made to remove from the system the effects of surface reflections from the base of pyramid 11.

In FIGURE 2 a return image 45 of a slit of light is shown 180° from the passive slit 40 on opaque disk 29. The return image 45 is actually a surface reflection from the base of pyramid 11 of the light emerging from active slit 41. As can be seen in FIGURE 2, because of the slight misalignment of pyramid 11 the surface reflection on 45 does not strike either of the photodetectors 34 or 35 and thus, has no effect on the present system.

Thus, if the member 12 with the pyramid 11 fixedly attached thereto is correctly aligned about the yaw axis light emerging from the active slit 41 falls on the passive area 40 and the detectors 30 and 31 are not activated. If the member 12 is slightly misaligned about the yaw axis light emerging from slit 41 will fall on one of the detectors 30 or 31 and an electrical signal will be produced which is indicative of the amount of misalignment about the yaw axis. Because of the triangular shape of photodetectors 30 and 31 as the misalignment of the member 12 about the yaw axis increases the returning slit of light will move horizontally along one of the detectors 30 or 31 and activate a greater portion thereof, thereby producing a larger electrical signal.

Some of the light emerging from active slit 41 will be reflected by the other pair of sides 51 and 53 of pyramid 11 and this light will appear as a return image 180° from slit 41 on the opaque disk 29. The passive area 43 between photodetectors 34 and 35 is located 180° from the active slit 41 and the light from active slit 41 reflected by sides 51 and 53 of pyramid 11 will fall in this passive area when the member 12 is correctly aligned in the roll axis. The light from slit 41 is reflected by sides 51 and 53 of pyramid 11 about the yaw axis. That is, this light will be reflected back onto the passive area 43 even though the pyramid 11 is slightly misaligned about the yaw axis. The light from slit 41 reflected by the sides 51 and 53 of pyramid 11 is intentionally moved vertically by a misalignment of the pyramid 11 relative to member 12 about the pitch axis. Thus, the light emerging from slit 41 and reflected by sides 51 and 53 has no effect on the system when the member 12 is misaligned about the yaw or pitch axis. However, any misalignment of the member 12 about the roll axis causes the light emerging from slit 41 and reflected by the sides 51 and 53 of pyramid 11 to be returned to the opaque disk 29 at an angle with the passive area 43 impinging on a greater area of detector 34 than 35 or vice versa. Therefore, as the misalignment of member 12 about the roll axis increases the angle with which the light from active slit 41 is reflected by sides 51 and 53 of pyramid 11 increases thereby increasing the area of photodetectors 34 or 35 which this light strikes. Because of the misalignment of pyramid 11 about the pitch axis the return image at area 43 rotates about a displaced center so that it impinges more on one detector than the other as it rotates. Thus, an electrical signal indicative of the misalignment of member 12 about the roll axis is produced by the photodetectors 34 and 35.

The light from lamp 15 emerging through slit 42 in opaque disk 29 is reflected by sides 51 and 53 of pyramid 11 so that it returns to slit 42. This light is relatively insensitive to movement of the pyramid 11 about the yaw axis and will return to slit 42 even though the member 12 is slightly misaligned about the yaw axis. However, if the member 12 is slightly misaligned about the pitch axis the light emerging from slit 42 will be reimaged, slightly displaced vertically from the slit 42. The greater the misalignment of the member 12 about the pitch axis the greater will be the displacement of the reflected image of slit 42. As the displacement of the reflected image of slit 42 increases, the area of the photodetectors 32 or 33 which is activated increases and the electrical signal produced increases. Therefore, the photodetectors 32 and 33 produce an electrical signal which is indicative of the amount of displacement of the member 12 about the pitch axis.

Light emerging from slit 42 is also reflected by sides 50 and 52 of pyramid 11. This reflected light is returned to the opaque disk 29 180° from the slit 42 and is illustrated in FIGURE 2 as the slit of light 46. The position to which this light is reflected is relatively insensitive to movements of member 12 about the pitch axis and only moves horizontally with misalignment of member 12 about the yaw axis. The slit of light 46 returns at an angle to its present position when the member 12 is misaligned about the roll axis. However, since the photodetectors 34 and 35 already indicate misalignment of the member 12 about the roll axis any indication of movement of this slit of reflected light would be redundant and is not utilized in the present apparatus.

In FIGURE 4, a schematic diagram of the present system is illustrated. The lamp 14 is connected to a pair of input terminals 60 and 61 by means of a pair of leads 62 and 63 respectively. The input terminals 60 and 61 should be connected to a suitable power source, which may be either AC or DC, to activate the lamp's filament. The lamp 15 is also connected to the terminals 60 and 61 by means of a pair of leads 64 and 65. The chopping disk is shown in its approximate relationship to the lamps 14 and 15 and the detectors 30 through 35.

The detectors 30 through 35 are illustrated by diode symbols in FIGURE 4. Photodetectors 30 and 31 are connected in a parallel-opposing arrangement whereby equal light intensity on each of the photodetectors results in substantially no electrical output therefrom. The photodetectors 30 and 31 each have one side connected to a junction point 70. Junction point 70 is further connected by a lead 71 to the input of an amplifier 72. The other side of the photodetectors 30 and 31 are connected to a junction point 73. Junction point 73 is further connected to ground 74 by a lead 75.

The photodetectors 34 and 35 have one side connected to a junction point 76. The other sides of photodetectors 34 and 35 are connected to a junction point 77. Photodetectors 34 and 35 are connected in a parallel-opposing arrangement so that when light of equal intensity strikes both photodetectors substantially no electrical output is provided therefrom. The junction point 76 is further connected to the input of an amplifier 78 by a lead 79. The junction point 77 is further connected to ground 74 through a lead 80.

Photodetectors 32 and 33 have one side connected to a junction point 81 and the other sides connected to a junction point 82. The photodetectors 32 and 33 are connected in a parallel-opposing arrangement whereby light having equal intensity striking both photodetectors simultaneously produces substantially no electrical output therefrom. Junction point 81 is further connected to an amplifier 83 by a lead 84. Junction point 82 is further connected to ground 74 by a lead 85. The amplifiers 72, 78 and 83 are all tuned to pass only the frequency with which the light is pulsating after it emerges from the chopping disk 20. Therefore, any stray light which should happen to enter the system will not have any effect thereon.

The output of amplifier 72 is applied to the input of a demodulator 86 by means of a lead 87. The output of amplifier 78 is applied to the input of a demodulator 88 by means of a lead 89. The output of amplifier 83 is applied to the input of a demodulator 90 by means of a lead 91. A photodetector 92 is placed at a convenient location, for example, between opaque disk 29 and chopping disk 20 where it will not block radiation to the active slits, so as to receive light passing through the chopping disk 20 and has one side connected to ground 74 by a lead 93. The other side of photodetector 92 is connected to the input of an amplifier 94 by means of a lead 95. Amplifier 94 is also tuned to the frequency with which the light passing through chopping disk 20 is pulsating. The output of amplifier 94 is connected as an input to the demodulators 86, 88 and 90 by a lead 96. The output from amplifier 94 operates as a reference signal for the demodulators 86, 88 and 90. A power supply 110, which has a pair of leads 111 and 112 connected thereto for energization, is connected to the amplifiers 72, 78, 83 and 94 by means of a lead 113.

In the present embodiment an indicator 100 is connected to the output of demodulator 86 by a lead 101. The other side of the indicator 100 is connected to ground 74 by a lead 102. The indicator 100 may be calibrated directly in seconds or minutes of arc and will give a direct indication of the misalignment of member 12 about the yaw axis. An indicator 103 is connected to the output of demodulator 88 by a lead 104. The other side of the indicator 103 is connected to ground 74 by a lead 105. The indicator 103 is calibrated to read the misalignment of the member 12 about the roll axis. A third indicator 106 is connected to the output of demodulator 90 by a lead 107. The other side of indicator 106 is connected to ground 74 by a lead 108. The indicator 106 indicates the misalignment of the member 12 about the pitch axis. It should be noted that the indicators 100, 103 and 106 are simply utilized for explanational purposes in this embodiment. In actual practice the signal from the amplifiers 86, 88 and 90 might be applied directly to servo motors or similar apparatus connected to the member 12 to properly align the member 12.

It should be noted that the present apparatus utilizes a system of mechanical chopping to provide a pulsating DC signal to the amplifiers 72, 78, 83 and 94 but that this invention should not be limited by the particular form shown. In fact the lamps 14 and 15 might actually be excited by a power source which is pulsating at the desired frequency so that the light would not need to be modulated.

Thus, a system has been disclosed which is capable of providing electrical signals indicative of the misalignment of a member about three orthogonal axes and which utilizes electro-optical apparatus to accomplish this task. Also, the present apparatus utilizes ordinary, non-polarized light which will operate through transparent objects without impairing the capabilities.

While we have shown and described a specific embodiment of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

We claim:

1. Apparatus for determining the orientation of a member about three orthogonal axes comprising:

means producing first and second orthogonal flat beams of light along an optical axis;

means chopping said first and second light beams at a characteristic frequency;

a first pair of flat reflecting surfaces mounted on said member and on said optical axis in a substantially mutually perpendicular relationship, the intersection of said first reflecting surfaces forming at least a portion of a line in space which intersects said optical axis;

a second pair of flat reflecting surfaces mounted on said member and on said optical axis in a substantially mutually perpendicular relationship, the intersection of said second reflecting surfaces forming at least a portion of a second line in space which intersects said optical axis and which is orthogonal to said first line;

optical means for collimating said first and second light beams into parallel orthogonal flat beams of light and directing said beams to all four of said first and second pair of flat reflecting surfaces;

a first pair of light detectors positioned adjacent to said optical axis so that said first beam of light just passes between said first pair of detectors after reflecting from said first pair of flat reflecting surfaces when said member is in a predetermined orientation about a first axis, said first pair of detectors having a shape which varies in width dependent on the distance from the space between said first pair of detectors so as to generate a signal proportional to the amount of displacement of said first beam, said displacement being indicative of rotation of the member about said first axis;

a second pair of light detectors positioned adjacent to said optical axis so that said second beam of light passes between said second pair of detectors after reflecting from said second pair of flat reflecting surfaces when said member is in a predetermined orientation about a second axis, said second pair of detectors having a shape which varies in width dependent on the distance from the space between said second pair of detectors so as to generate a signal proportional to the amount of displacement of said second beam, said displacement being indicative of rotation of the member about said second axis;

a third pair of rectangular light detectors positioned so that said first beam of light just passes between said third pair of detectors after reflecting from said second pair of flat reflecting surfaces when said member is in a predetermined position about a third axis, said third pair of detectors generating a signal proportional to the amount of inclination of said first light beam, said inclination being indicative of rotation of the member about said third axis; and display means sensitive to the electrical signal from said detectors at the characteristic frequency for indicating the orientation of the member about the three axes.

2. The apparatus of claim 1 wherein said first and second pairs of light detectors have a generally triangular shape and said first and second pairs of reflecting surfaces comprise the sides of a pyramidal internally reflecting prism.

References Cited

UNITED STATES PATENTS

| | | | |
|---|---|---|---|
| 2,431,510 | 11/1947 | Salinger | 250—236 X |
| 2,873,381 | 2/1959 | Lauroesch | 250—236 |
| 2,952,779 | 11/1960 | Talley. | |
| 2,964,640 | 12/1960 | Wippler. | |
| 3,079,835 | 3/1963 | Saperstein. | |
| 3,197,643 | 7/1965 | Morris. | |
| 3,207,904 | 9/1965 | Heinz, | |
| 3,241,430 | 3/1966 | Kulick. | |
| 3,296,921 | 1/1967 | Polster. | |

FOREIGN PATENTS 582,096 11/1946 Great Britain.

JEWELL H. PEDERSEN, *Primary Examiner.*

W. A. SKLAR, *Assistant Examiner.*

U.S. Cl. X.R.

250—233